UNITED STATES PATENT OFFICE.

ELMER L. KNOEDLER, OF GLOUCESTER CITY, NEW JERSEY, ASSIGNOR TO WELSBACH COMPANY, OF GLOUCESTER, NEW JERSEY, A CORPORATION OF NEW JERSEY.

TREATING MONAZITE SAND.

1,361,735.     Specification of Letters Patent.     Patented Dec. 7, 1920.

Application filed May 1, 1918. Serial No. 231,860.

*To all whom it may concern:*

Be it known that I, ELMER L. KNOEDLER, a citizen of the United States, residing at Gloucester City, in the county of Camden and State of New Jersey, have invented a new and useful Improvement in Treating Monazite Sand, of which the following is a full, clear, and exact description, reference being had to the accompanying drawings, forming part of this specification, in which—

Figure 1:
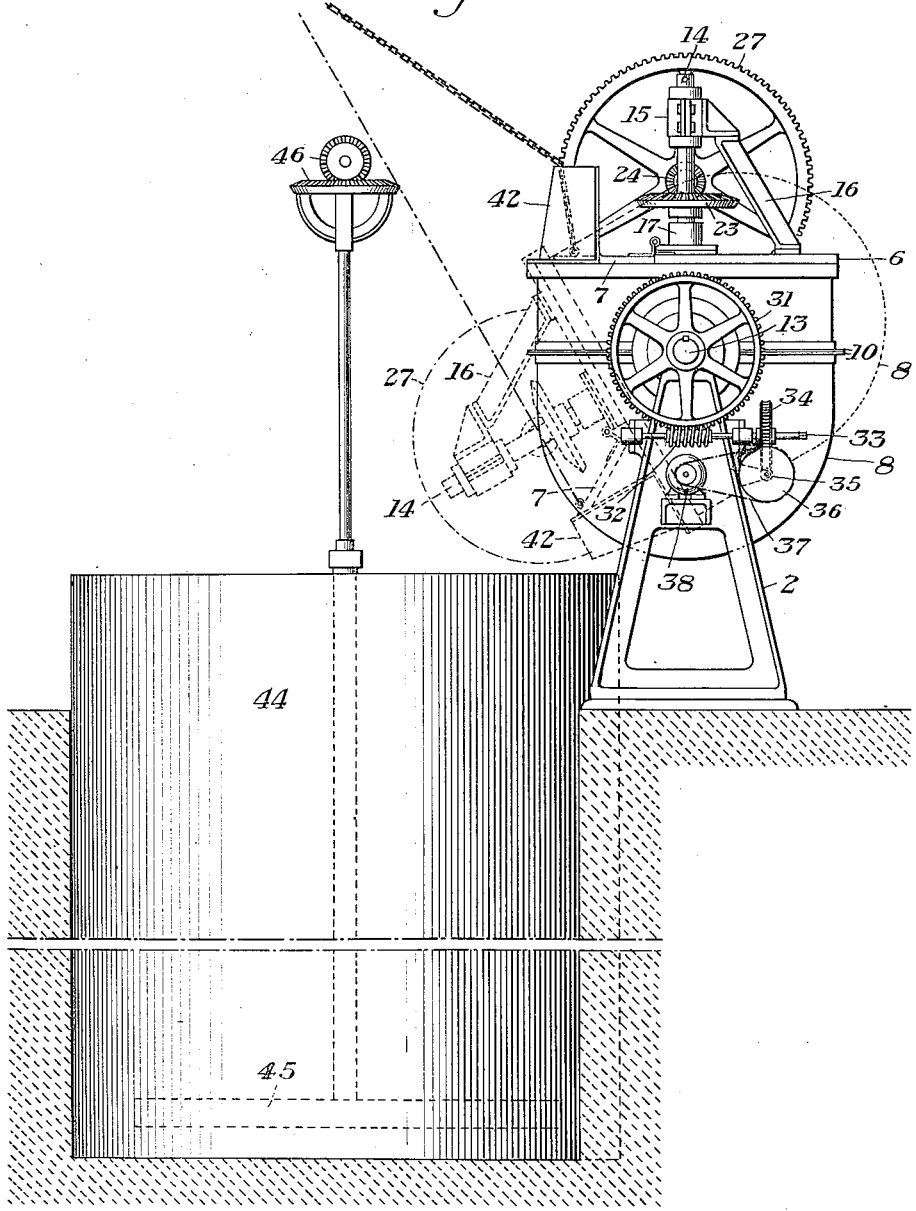
Figure 2:
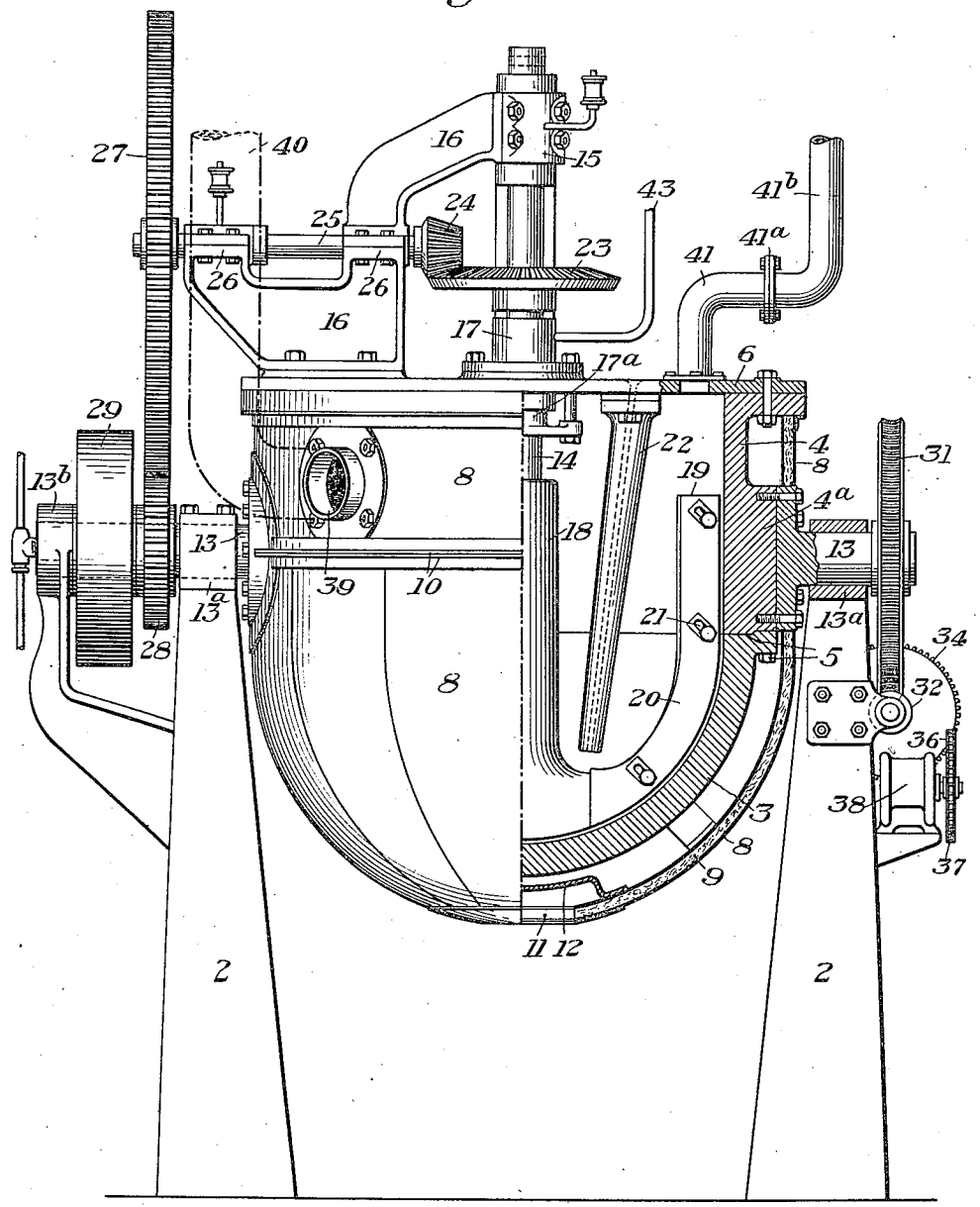

Figure 1 is a sectional elevation showing one form of apparatus suitable for carrying out my invention, and Fig. 2 is a view, partly in front elevation and partly in vertical section of the pot furnace shown in Fig. 1.

My invention has relation to the treatment of monazite sand for the recovery of thorium and other rare earth materials therefrom; and is designed to provide a simple, novel and efficient method whereby the sand may be given its usual heat treatment with sulfuric acid and then be readily removed directly into the drowning tank or vessel.

Heretofore, in so far as I am aware, the usual practice has been to place the mixture of monazite sand and sulfuric acid in an iron pot set in a brick furnace, and after the material has been heated or fused, it is cooled, or partially cooled, and is then dug out of the pot and carried away for the next operation, which consists in drowning the material in a vessel containing water. This operation of removing the material from the pot is a difficult and laborious one.

In accordance with my invention, I provide a heating pot or furnace which is located directly adjacent to the drowning vessel or tank and which is of such character that when the heat treatment has been completed, the pot or vessel containing the mixture can be readily tilted so as to discharge its contents directly into the drowning tank. I furthermore employ means whereby the material, as it is being poured from the pot furnace into the drowning tank, may be more or less constantly stirred or agitated.

In carrying out my invention I may employ any suitable apparatus of the general character above described; but preferably employ the special form of tilting pot furnace which I have described and claimed in my co-pending application, Serial No. 231859, dated May 1, 1918; and in the accompanying drawings I have illustrated this form of apparatus.

In these drawings, the numeral 2 designates suitable stands or supports in which the pot furnace is trunnioned above the floor level. The pot furnace consists of an inner receptacle of iron or other suitable metal, which is preferably formed in a separate bottom section 3 and an upper section 4, the two sections being suitably fitted and bolted together, as indicated at 5. The top of the vessel has secured thereto a cover plate 6 having a hinged portion or segment 7 at one side. This hinged portion or segment can be raised on its hinges when the pot is tipped to permit of the discharge of the contents of the pot.

8 designates an outer shell which is suitably spaced away from the inner vessel 3—4. It may be formed of spaced outer and inner metal plates having a filling or lining of heat resisting material 9, such as asbestos. This outer shell or jacket is also preferably formed in two sections corresponding approximately to the sections of the inner vessel and which may be united by means of the opposed bolting flanges 10. By making both the inner vessel and the outer shell or jacket in sections in the manner described, portions of either may be readily removed and renewed without the necessity for throwing away and replacing the entire structure. Most all of the wear on the pot is on the lower section and the burning of the outer shell is largely confined to the lower section. Therefore, it is of material advantage to be able to readily renew and replace these sections. It will be noted that these lower sections do not carry any of the other working parts. The outer jacket or shell has a bottom opening 11 through which heat may be supplied to the space between the shell or jacket of the inner vessel by means of suitable burners, (not shown) placed below the furnace. Any suitable baffle arrangement 12 may be placed adjacent to this opening 11 in order to properly distribute the heating medium around the furnace.

The upper portion 4 of the inner vessel is formed at opposite sides with the projections $4^a$ to which are secured suitable trunnions 13 which are journaled in bearings $13^a$ carried by the supports 2. 14 designates a vertical shaft which is mounted centrally of the furnace in a suitable bearing 15 carried by a bracket 16 secured to the fixed portion of the cover plate 6, and also in the lower bearing 17 and stuffing box 17$^a$ carried by said cover plate. The stuffing box 17$^a$ serves to prevent lubricating oil from the bearing working down into the pot. The shaft 14 is connected with a stirrer or agitator located within the inner vessel and which may be of any desired form. In the drawings we have shown this stirrer or agitator as having a central arm 18 secured to the shaft 14 and the lateral stirrer arms 19 which are curved to approximately fit the interior wall of the vessel, the two stirrer arms being oppositely arranged and the stirrer being of general U-shape.

These stirrer arms are preferably somewhat curved; and in the preferred form of my invention are provided with removable and renewable wear members 20. These wear members conform generally to the shape of the surfaces of the arms to which they are secured and they are shown as removably bolted thereto. To receive these bolts, the wear members and stirrer arms may be provided with oblique slots 21, thereby avoiding the necessity for exact registry of the bolting holes.

22 designates a hollow breaking leg or bar which is fastened to the under side of the cover plate and which depends within the vessel in position to act to break up any mass that might tend to form between the axis of rotation of the stirrer and the wings or arms of the stirrer. This breaking up leg is preferably made hollow so that a thermo-couple may be placed therein to act as a pyrometer.

The shaft 14 is provided with a bevel gear wheel 23, which is driven by a bevel pinion 24 mounted on a horizontal shaft 25 journaled in suitable bearings 26 on the bracket 16 before referred to. On the outer end of the shaft 25 is a large spur gear wheel 27 which meshes with the pinion 28 journaled on one of the trunnions 13, the trunnion being extended and the extension having a second bearing 13$^b$ between which and the adjacent bearing 13$^a$, the pinion 28 is located. 29 designates a belt wheel or pulley, also mounted on this trunnion extension and which is arranged to be driven by a belt or any suitable source of power. The belt wheel 29 and pinion 28 are both loosely mounted on this trunnion extension and are preferably connected to each other by some form of safety device which will permit the belt wheel to turn independently of the pinion in case of excess load, such as might be caused by a stiffening up of the furnace charge.

The opposite trunnion is provided with a worm wheel 31 which is engaged by a worm 32 journaled on one of the supports 2, this worm wheel forming means for tilting the pot on its trunnions. The worm may be actuated either by engaging a suitable bar or wrench with the end portion 33 of the worm shaft; or said shaft may be provided with a worm wheel 34 engaged by a worm 35 connected to a sprocket wheel 36. The wheel 36 is driven by a sprocket chain 37 from a suitable electric motor 38 which may be placed on one of the supports 2.

Means of any well known or suitable character may be provided for automatically opening the circuit of the motor 38 when the pot has been tipped to its proper position for complete dumping.

The heavy tilting worm gear acts as a suitable stabilizer while the contents of the pot are being cooked and agitated and tends to prevent the pot from turning on its trunnions when the charges become stiff. It will also be noted that the strain of the belt pull on the wheel 29 is largely counterbalanced by the heavy worm gear.

The products of combustion may be discharged from the heating space between the inner vessel and the outer jacket or shell by means of an outlet connection 39 (see Fig. 2) which, when the parts are in normal position, is designed to register with a suitable flue 40, shown in dotted lines in Fig. 2.

The fumes or vapors from the inner vessel may be carried off by any suitable connection. For this purpose, I have shown the pot cover as having an outlet connection 41 which, when the pot is in normal position, is detachably connected at 41$^a$ to an offtake flue 41$^b$. When the pot is to be tipped, the bolts are removed from the connection 41$^a$. Any suitable form of detachable joint may be used at 41$^a$.

It will be noted that when the pot is tipped in dumping position, the gearing and connection for actuating the stirrer or agitator move bodily with the furnace, thereby permitting the agitation to be continued during the dumping operation. This is an important feature of the invention since it thereby insures a complete cleaning out of all the material of the charge. Also, while the contents of the pot are being stirred, the pot can be gradually tipped, a little at a time, so that the charge is continually agitated and may be slowly and accurately poured out exactly as wanted. This is an important feature. The cooking of the mixture requires a high temperature and to reach such temperature, the water and sulfuric acid are driven off so that the mass reaches a plastic condition in the form of a rather soft dough. The combined tilting and stirring to discharge the contents is of particular advantage in discharging this material. The stirring enables the cooking vessel to be thoroughly cleaned out without the danger of a large amount of material sticking fast to the walls of the pot.

42 designates a pouring lip or guide which is secured to the dumping side of the pot.

If desired, the bearings may be water-cooled in any known manner. 43 in Fig. 2 designates a pipe for supplying water to the bearing 17 for this purpose.

Any suitable or usual form of drowning tank may be employed, such as that indicated at 44 in Fig. 1. This tank is also preferably provided with suitable agitating means 45 which may be driven by suitable gearing such as indicated at 46.

I claim:

1. In the treatment of monazite sand, the improvement which consists in heating a mixture of monazite sand and sulfuric acid, and pouring the heated mixture directly from the pot or vessel in which it is heated into a drowning tank.

2. In the treatment of monazite sand the improvement which consists in heating a mixture of monazite sand and sulfuric acid, pouring the mixture directly from the heating vessel into a tank containing water and agitating the mixture in the heating vessel during the pouring operation.

3. In the treatment of monazite sand, the improvement which consists in heating a mixture of monazite sand and sulfuric acid in a tiltable vessel, gradually tilting said vessel to discharge its contents directly into a drowning tank, and agitating the contents of the heating vessel during the discharge.

In testimony whereof, I have hereunto set my hand.

ELMER L. KNOEDLER.

Witnesses:
 THOS. K. LANCASTER,
 ALONZO G. HARRISON.